(12) United States Patent
ten Have

(10) Patent No.: US 9,952,385 B2
(45) Date of Patent: Apr. 24, 2018

(54) ARRANGEMENT TO OPTICALLY COUPLE MULTIPLE WAVEGUIDES TO A FEW-MODE FIBER

(71) Applicant: CCS Technology, Inc., Wilmington, DE (US)

(72) Inventor: Eric Stephan ten Have, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/872,264

(22) Filed: Oct. 1, 2015

(65) Prior Publication Data

US 2016/0124151 A1    May 5, 2016

(30) Foreign Application Priority Data

Oct. 31, 2014 (EP) ..................................... 14191307

(51) Int. Cl.

| G02B 6/14 | (2006.01) |
|---|---|
| G02B 6/32 | (2006.01) |
| G02B 3/08 | (2006.01) |
| G02B 6/26 | (2006.01) |

(52) U.S. Cl.
CPC ................. *G02B 6/14* (2013.01); *G02B 3/08* (2013.01); *G02B 6/32* (2013.01); *G02B 6/262* (2013.01)

(58) Field of Classification Search
None
See application file for complete search history.

(56) References Cited

U.S. PATENT DOCUMENTS

| 8,229,258 B2 * | 7/2012 | Ishikawa ................... G02F 1/31 |
|---|---|---|
| | | 385/11 |
| 2010/0329671 A1 * | 12/2010 | Essiambre ............... G02B 6/14 |
| | | 398/44 |
| 2012/0224807 A1 * | 9/2012 | Winzer ..................... G02B 6/14 |
| | | 385/28 |

(Continued)

FOREIGN PATENT DOCUMENTS

| WO | WO2011/126814 A2 | 10/2011 | ............. H04B 10/13 |
|---|---|---|---|
| WO | WO2013/033703 A1 | 3/2013 | ............. H04J 14/04 |
| WO | WO2013/133972 A1 | 9/2013 | ............... G02B 6/42 |

OTHER PUBLICATIONS

Holographic Offset Launch for Dynamic Optimization and Characterization of Multimode Fiber Bandwidth, Carpenter et al., Journal of Lightwave Technology, vol. 30, No. 10, May 15, 2012, 7 pages.

(Continued)

*Primary Examiner* — Chad H Smith
(74) *Attorney, Agent, or Firm* — Michael E. Carroll, Jr.

(57) ABSTRACT

An arrangement to optically couple multiple waveguides to a few-mode fiber comprises an optical assembly to respectively deflect light beams impacting the optical assembly and an optical coupler being configured to convert a respective fundamental mode of a plurality of the light beams coupled out of a respective different one of a plurality of the multiple waveguides and impacting the optical coupler to a respective higher order mode of each of the plurality of the light beams. The optical assembly comprises a first optical device to deflect each of the light beams impacting the first optical device from the optical coupler to a core section of the few-mode fiber to transfer light within the few-mode fiber.

18 Claims, 12 Drawing Sheets

(56) References Cited

U.S. PATENT DOCUMENTS

2014/0003777 A1    1/2014  Sengupta .................... 385/124
2015/0098697 A1*   4/2015  Marom .................. H04J 14/04
                                                        398/44

OTHER PUBLICATIONS

Selective excitation of the LP11 mode in step index fiber using a phase mask, Mohammed et al., Optical Engineering 45(7), 074602, Jul. 2006, downloaded from the internet on Sep. 17, 2015, 7 pages.
European Search Report, Application No. 14191307.9, dated Apr. 15, 2015, 8 pages.

* cited by examiner

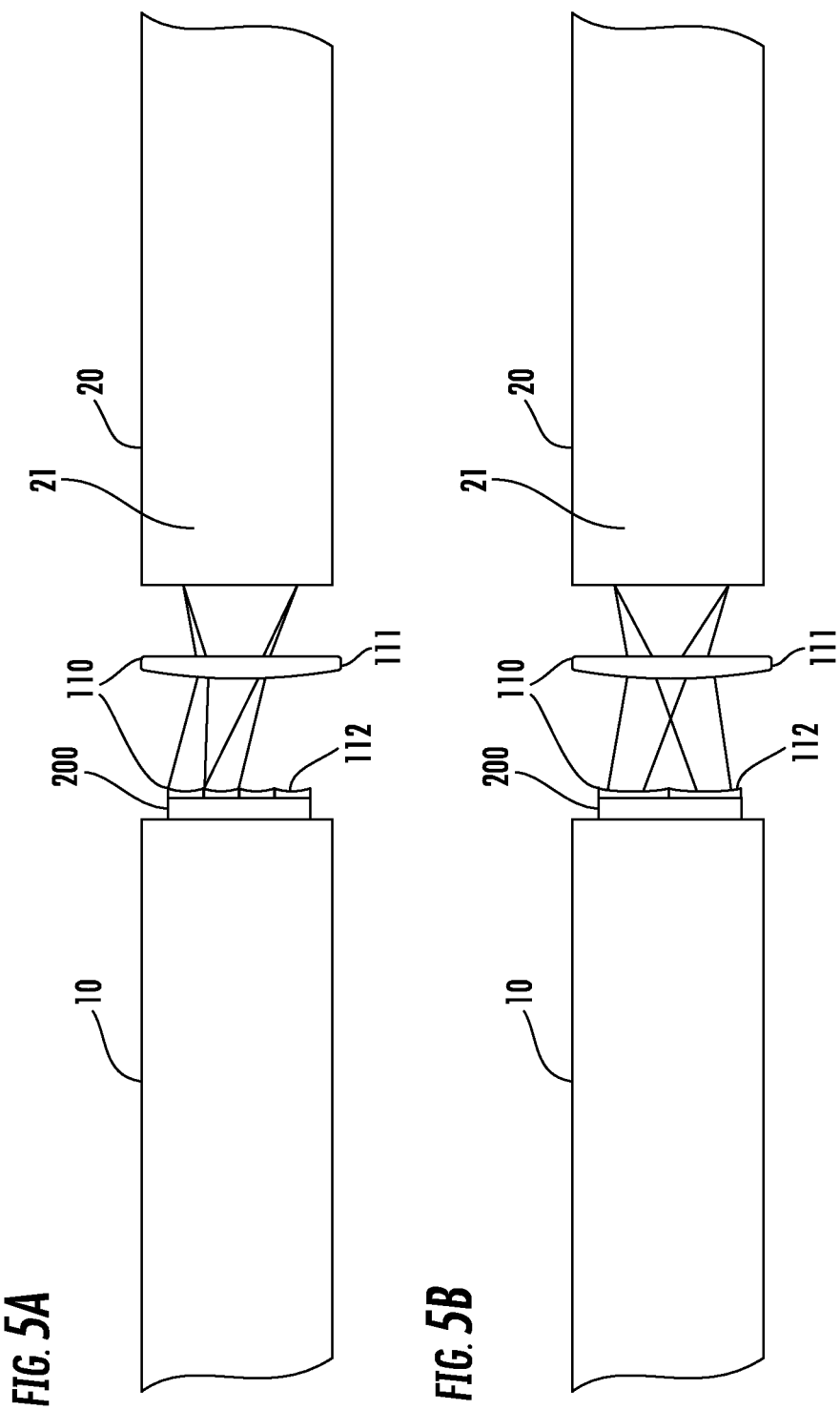

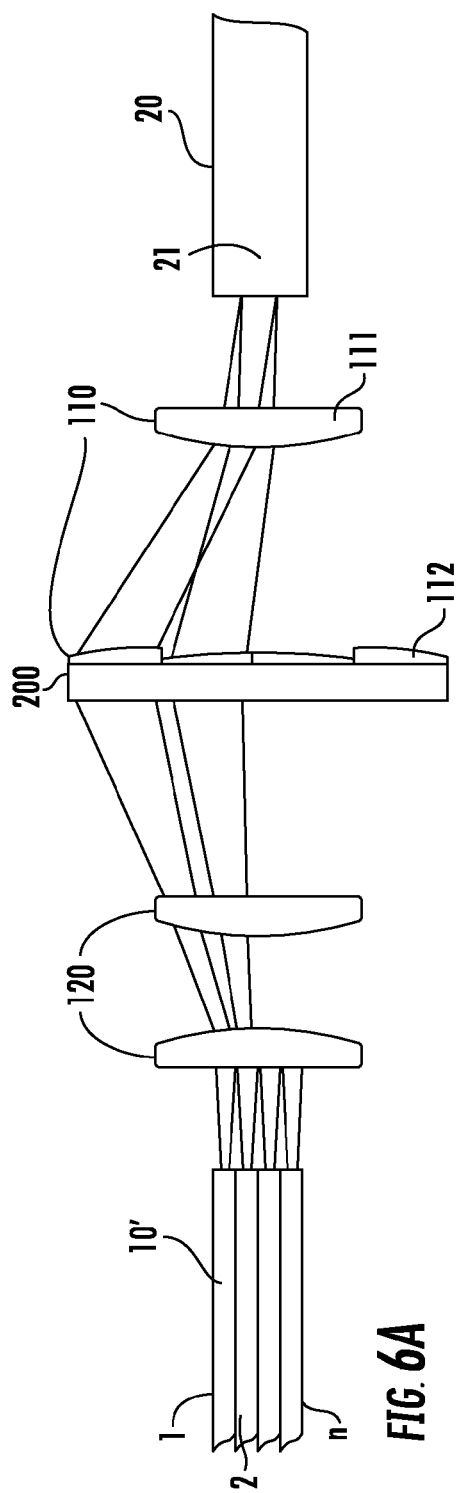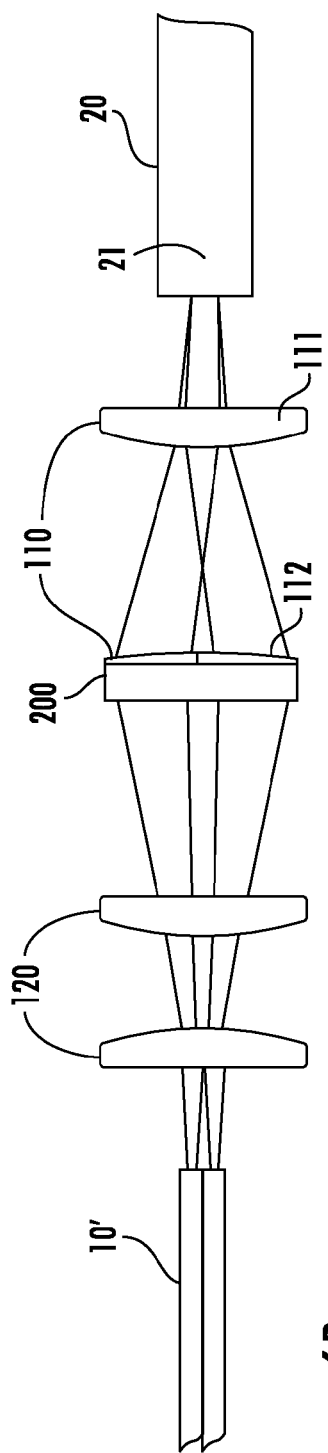
FIG. 6A
FIG. 6B

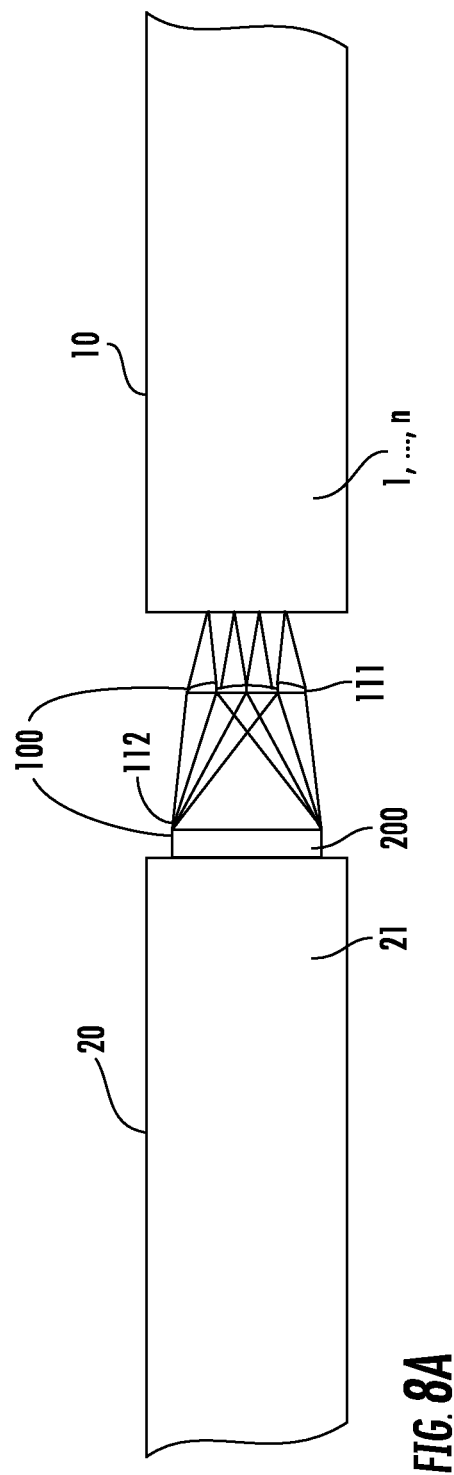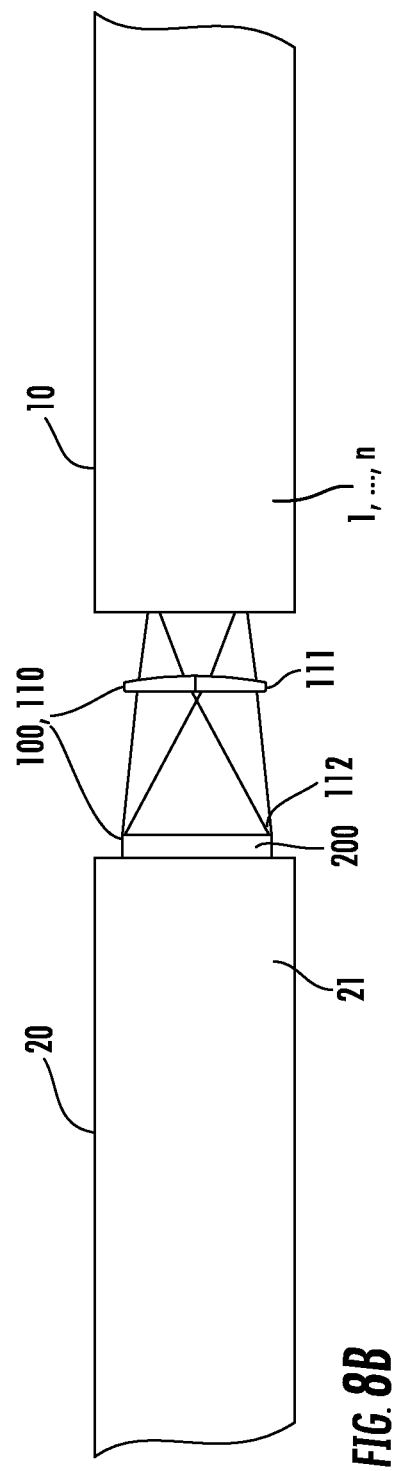

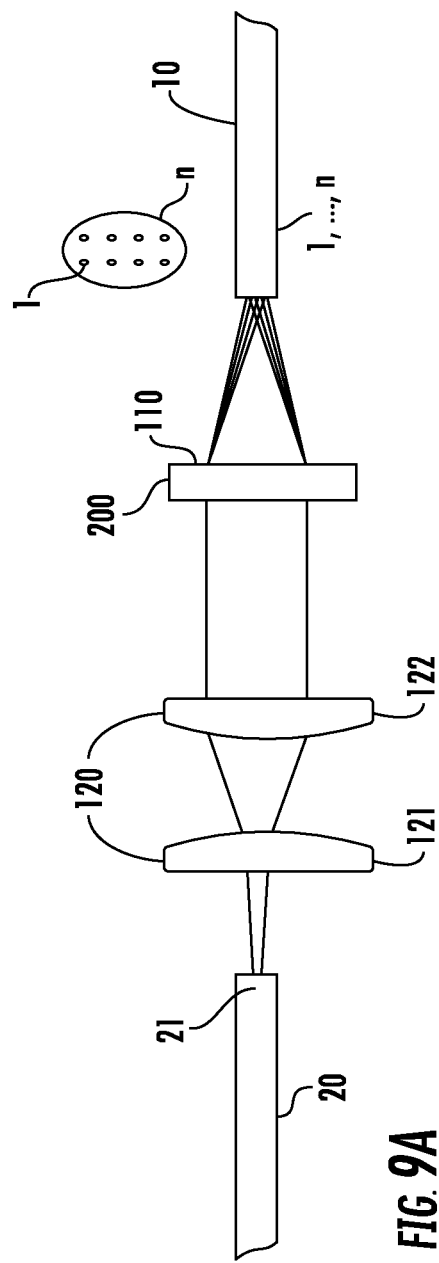
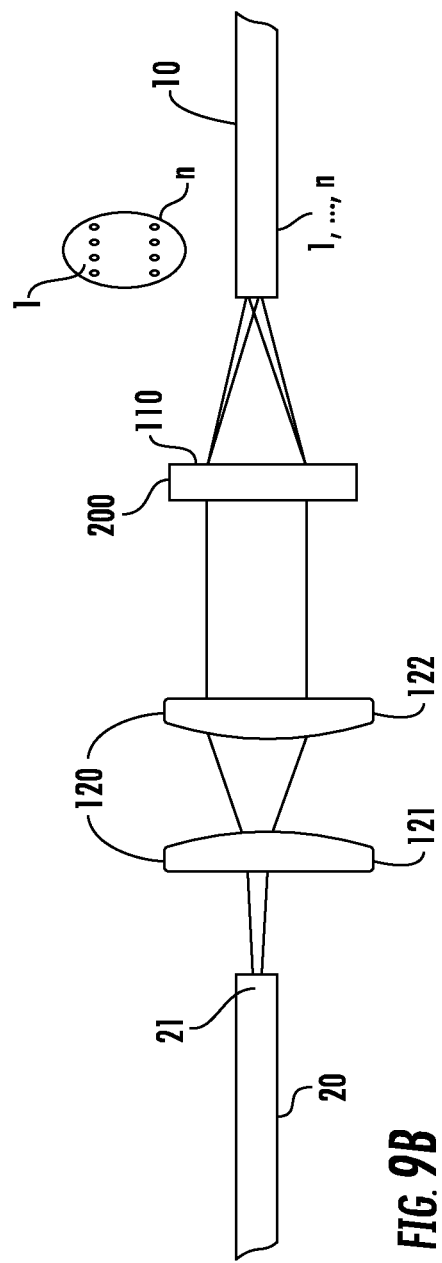
FIG. 9A
FIG. 9B

ARRANGEMENT TO OPTICALLY COUPLE MULTIPLE WAVEGUIDES TO A FEW-MODE FIBER

PRIORITY APPLICATION

This application claims the benefit of priority under 35 U.S.C. § 119 of European Patent Application Serial No. 14191307.9, filed on Oct. 31, 2014, the content of which is relied upon and incorporated herein by reference in its entirety.

FIELD

The disclosure is directed to an arrangement to optically couple multiple waveguides to a few-mode, wherein light is transferred from the multiple waveguides to the few-mode fiber. The disclosure is further directed to an arrangement to optically couple multiple waveguides to a few-mode fiber, wherein the light is transferred from the few-mode fiber to the multiple waveguides.

BACKGROUND

Multiple waveguides may be used in certain optical transmission means, such as multi-core fibers. Multi-core fibers comprise several cores within the fiber with each core being able to transmit an optical signal. It is expected that multi-core fibers will play a major role in the newly developing field of Silicon Photonics. As used herein, "Silicon Photonics" means using a chip such as an integrated circuit (IC) having the ability for receiving optical signals along with the electronic functionality in the chip, for example a chip with silicon or III/V-materials. The advantages of Silicon Photonics are reduced space and power requirements concurrent with increased speed and lower costs. These photonic structures on an optical chip still have to be optically connected to the outer devices through optical waveguides such as optical fibers.

The geometry of the multi-core fibers makes them highly favorable for use in Silicon Photonics, since in a small volume the signals of multiple sources can be coupled to a single fiber. Especially edge coupling of a fiber to a silicon chip is very promising. Multi-core fibers can be used for coupling multiple waveguides, for example on a chip, to multiple cores in a single fiber.

Few-mode fibers are fibers having a core section in which a plurality of different modes, such as higher order modes of a fundamental mode of a light beam, may be transferred. Therefore, for certain applications the transmission properties of few-mode fibers are deemed superior to multi-core fibers. Typically, few mode fibers have a single core for transmitting the optical signals.

A multi-core fiber, for example, might not be the most optimal means for transmitting signals over long distances. This can more easily and cheaply be done by multi-mode or few-mode fibers. On the other hand, a few-mode fiber having a single optical core to transfer the different light modes cannot be easily coupled to multiple waveguides on a Silicon Photonics chip.

There is a need to provide an arrangement to optically couple multiple waveguides to a few-mode fiber, wherein light is transferred from the multiple waveguides to the few-mode fiber with low optical losses. There is also a desire to provide an arrangement to optically couple multiple waveguides to a few-mode fiber, wherein light is transferred from the few-mode fiber to the multiple waveguides with low optical losses.

SUMMARY

An arrangement to optically couple multiple waveguides to a few-mode fiber to transfer light from the multiple waveguides to the few-mode fiber is specified in present claim 1. The arrangement enables the coupling of several single mode fibers, or waveguides as well as a multi-core fiber, such as a multi-core single mode fiber, to a few-mode fiber, for example a single-core few-mode fiber, without significant coupling loss.

According to an embodiment of the arrangement to optically couple multiple waveguides to a few-mode fiber to transfer light from the multiple waveguides to the few-mode fiber, the arrangement comprises an optical assembly to respectively deflect light beams impacting the optical assembly, an optical coupler being configured to convert a respective fundamental mode of a plurality of the light beams coupled out of a respective different one of a plurality of the multiple waveguides and impacting the optical coupler to a respective higher order mode of each of the plurality of the light beams. The optical assembly comprises a first optical device to deflect each of the plurality of the light beams impacting the first optical device from the optical coupler to a core section of the few-mode fiber to transfer light within the few-mode fiber. The first optical device is arranged between the optical coupler and the few-mode fiber.

According to an embodiment of the arrangement, the optical assembly may comprises a second optical device that images the cores of the multiple waveguides, for example the cores of the multi-core single-mode fiber separately onto the optical coupler. To this purpose, the second optical device is configured to deflect each of the light beams leaving a respective one of the multiple waveguides separately to a region of the optical coupler. The optical coupler converts the separate single modes of the plurality of the light beams to different modes that are then imaged by the first optical device onto the end face of the few-mode fiber and coupled into the core of the few-mode fiber. The optical coupler may be configured as a phase mask or a mirror device with phase modifying structures on the reflecting surface.

An arrangement to optically couple a few-mode fiber to multiple waveguides to transfer light from the few-mode fiber to the multiple waveguides is specified in present claim 12. The arrangement enables the coupling of a few-mode fiber to a multi-core fiber, several single mode fibers, or waveguides without significant coupling loss.

According to an embodiment of an arrangement to optically couple multiple waveguides to a few-mode fiber to transfer light from the few-mode fiber to the multiple waveguides, the assembly comprises an optical assembly to deflect light beams impacting the optical assembly and an optical coupler to convert a higher order mode of each of the light beams coupled out of the few-mode fiber to a respective fundamental mode of each of the light beams. The optical assembly comprises a first optical device to deflect each of the light beams impacting the first optical device from the optical coupler to a respective different one of the multiple waveguides.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

BRIEF DESCRIPTION OF THE DRAWINGS

FIG. 5A shows a fifth embodiment of an arrangement to optically couple multiple waveguides of a multi-core fiber to a few-mode fiber to transfer light from the multiple waveguides to the few-mode fiber from a first direction;

FIG. 5B shows the fifth embodiment of an arrangement to optically couple multiple waveguides of a multi-core fiber to a few-mode fiber to transfer light from the multiple waveguides to the few-mode fiber from a second direction;

FIG. 6A shows an embodiment of an arrangement to optically couple multiple waveguides of single-mode fibers to a few-mode fiber from a first direction;

FIG. 6B shows an embodiment of an arrangement to optically couple multiple waveguides of single-mode fibers to a few-mode fiber from a second direction;

FIG. 8A shows a first embodiment of an arrangement to optically couple a few-mode fiber to multiple waveguides of a multi-core fiber to transfer light from the few-mode fiber to the multiple waveguides from a first direction;

FIG. 8B shows the first embodiment of an arrangement to optically couple a few-mode fiber to multiple waveguides of a multi-core fiber to transfer light from the few-mode fiber to the multiple waveguides from a second direction.

FIG. 9A shows a second embodiment of an arrangement to optically couple a few-mode fiber to multiple waveguides of a multi-core fiber to transfer light from the few-mode fiber to the multiple waveguides from a first direction.

FIG. 9B shows the second embodiment of an arrangement to optically couple a few-mode fiber to multiple waveguides of a multi-core fiber to transfer light from the few-mode fiber to the multiple waveguides from a second direction.

DETAILED DESCRIPTION

Figure 1A:
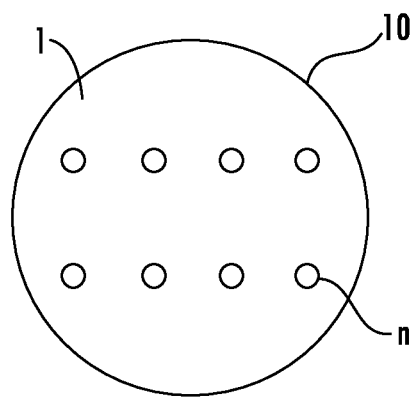
FIG. 1A shows a cross-sectional view of a multi-core fiber.
Figure 1B:
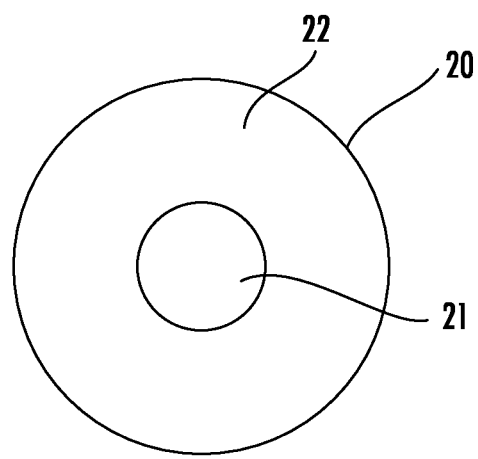
FIG. 1B shows a cross-sectional view of a few-mode fiber.

FIG. 1A shows the positions and the distribution of single optical waveguides 1, . . . , n, particularly single mode cores, inside a multi-core fiber 10. FIG. 1B shows a few-mode fiber 20 comprising a core section 21 to transmit light within the few-mode fiber. The core section 21 is surrounded by a cladding 22. The few-mode fiber is configured to transfer a fundamental and higher order modes of a light beam.

In order to take advantage of an optical technology using on the one hand a multi-core fiber for transmitting light and using on the other hand a few-mode fiber as optical transmission means, the multi-core fiber has to be optically coupled to the few-mode fiber to transfer light between the different transmission means. FIG. 2A to FIG. 5B shows different embodiments of an arrangement to optically couple multiple waveguides 1, . . . , n of a multi-core fiber 10 to a few-mode fiber 20 to transfer light from the multiple waveguides of the multi-core fiber to the few-mode fiber. Each of the arrangements shown in FIGS. 2A to 5B comprises an optical assembly 100 to respectively deflect light beams impacting the optical assembly 100.

Figure 10:
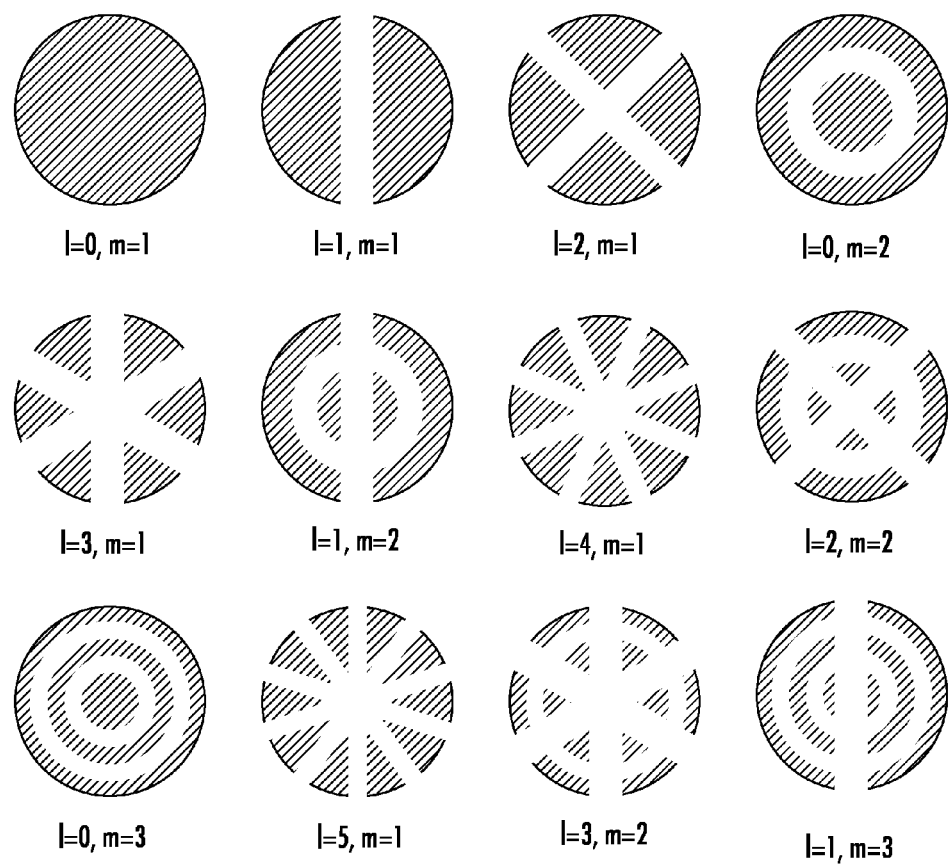
FIG. 10 shows intensity profiles of different modes of a light beam generated by the optical coupler from the fundamental mode.

Furthermore, the arrangements shown in FIGS. 2A to 5B respectively comprise an optical coupler 200 to convert a respective fundamental mode of a plurality of the light beams coupled out of a respective different one of a plurality of the multiple waveguides 2, . . . , n to a respective higher order mode of each of the light beams. FIG. 10 shows intensity profiles of different modes that may be generated by the optical coupler 200 from the fundamental mode illustrated in FIG. 10 on the top left corner having the parameters l=0 and m=1.

The optical coupler 200 of the embodiments of FIGS. 2A to 7B may be configured to keep the fundamental mode of the light beam of one of the multiple waveguides, for example the waveguide 1, impacting the optical coupler 200 unchanged so that only the plurality of the light beams leaving the optical waveguides 2, . . . , n are transformed to the higher order modes. According to this embodiment, the optical coupler 200 is configured to transform n−1 light beams of the n-waveguides 1, . . . , n of the single-mode cores of the multi-mode fiber 10 from the fundamental mode to higher order modes.

Although the optical coupler is described in the following as being embodied to transform the respective fundamental mode of the light beams of the optical waveguides 2, . . . , n to higher order modes and to keep the fundamental mode of the light beam from the optical waveguide 1 unchanged, the optical coupler 200 is not restricted to this embodiment. According to another embodiment, the plurality of waveguides may comprise all of the optical waveguides 1, . . . , n. According to this other embodiment, the optical coupler 200 shown in FIGS. 2A to 7B may be configured to convert a fundamental mode of each of the light beams coupled out of a respective different one of the multiple waveguides 1, . . . , n to a respective higher order mode of each of the light beams.

After the mode transformation all separate beams have to be combined and launched into the few-mode fiber. To this purpose, the optical assembly 100 comprises an optical device 110 to deflect each of the light beams impacting the optical device 110 from the optical coupler 200 to the core section 21 of the few-mode fiber 20. The optical device 110 may be configured to direct each of the light beams to a respective spatially different part of the core section 21 of the few-mode fiber 20. The optical device 110 is arranged between the optical coupler 200 and the few-mode fiber 20. The optical device 110 can be partly incorporated into the optical coupler, be partly combined with the optical coupler as, for example separate lenses attached to the optical coupler, or be completely separated from the optical coupler.

According to an embodiment of the arrangement to optically couple multiple waveguides of a multi-core fiber to the few-mode fiber to transfer light from the multiple waveguides to the few-mode fiber, the optical device 110 comprises an optical element 111 and an optical structure 112. The optical structure 112 is configured to deflect each of the light beams impacting the optical structure 112 from the optical coupler 200 to the optical element 111. The optical structure 112 may be incorporated in the optical coupler 200 or may be arranged on a surface of the optical coupler 200. The optical structure 112 may be configured as separate lenses for each mode being attached to the surface of the optical coupler 200. The optical element 111 is configured to deflect each of the light beams impacting the optical element 111 from the optical structure 112 to the core section 21 of the few-mode fiber 20. The optical element 111 may be arranged between the optical structure 112 and the few-mode fiber 20.

Figure 2A:
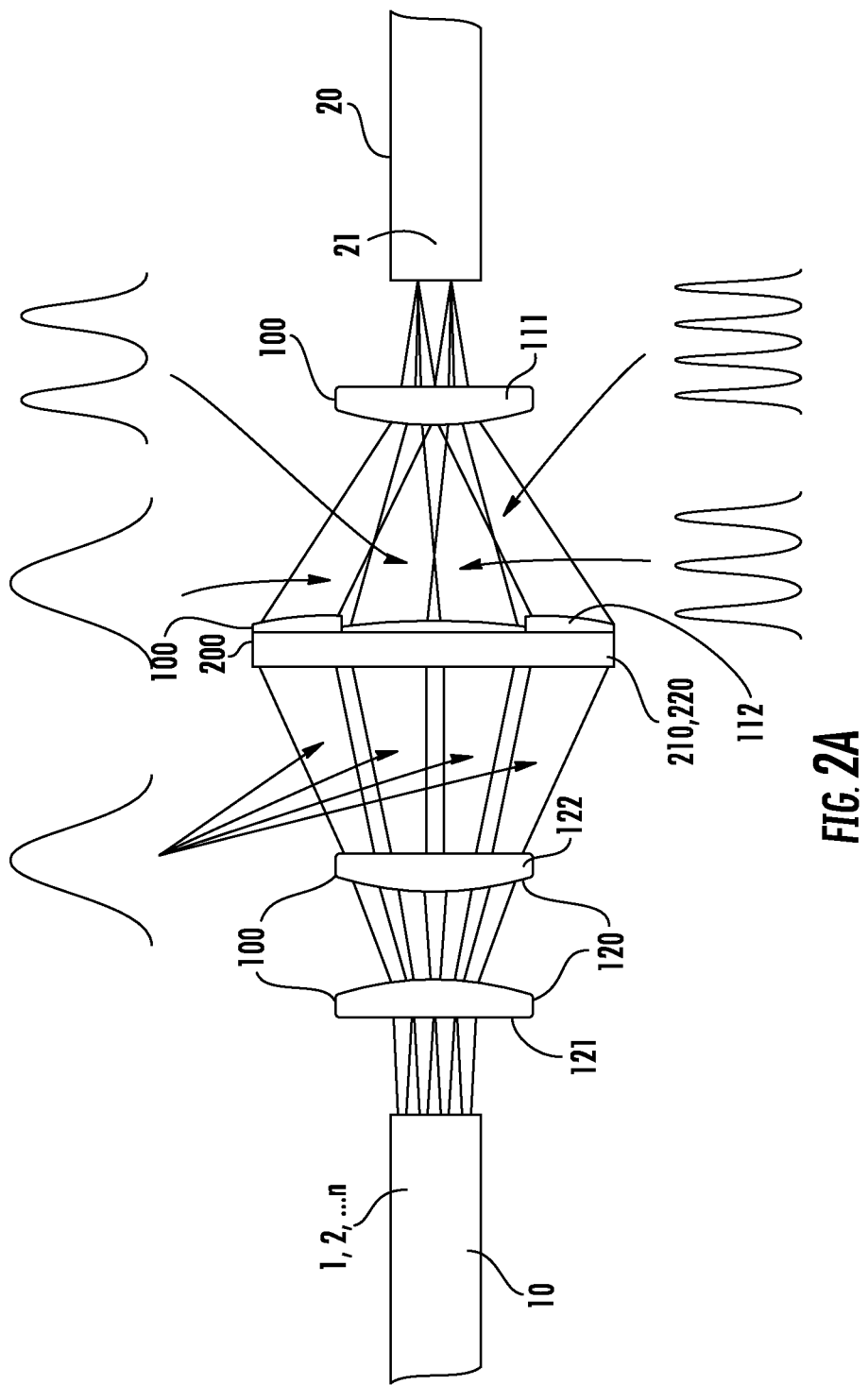
FIG. 2A shows a first embodiment of an arrangement to optically couple multiple waveguides of a multi-core fiber to a few-mode fiber to transfer light from the multiple waveguides to the few-mode fiber from a first direction.

FIGS. 2A to 5B show optical paths of light beams leaving the multiple waveguides 1, . . . , n of the multi-core fiber 10 and passing through the optical coupler 200 and the optical structure 112 and the optical device 111, before the light beams enter the few-mode fiber 20. FIGS. 2A and 2B respectively show an embodiment of an arrangement to optically couple multiple waveguides of a multi-core fiber to a few-mode fiber to transfer light from the multiple waveguides to the few-mode fiber from different directions. FIG. 2A shows the n fundamental modes of the light beams leaving the multiple waveguides 1, . . . , n and the n−1 higher order modes generated by the optical coupler 200 as well as one fundamental mode, for example the fundamental mode of the light beam leaving the optical waveguide 1, which is kept unchanged by the optical coupler 200. The optical assembly 100 is configured to feed the light beams of the higher order modes and the fundamental mode being kept unchanged into the few-mode fiber 20. The optical assembly 100 may comprise at least an optical lens, for example the lens 111, arranged between the optical coupler 200 and the few-mode fiber 20 to feed the light beams leaving the optical coupler 200 into the few-mode fiber 20. Different embodiments of the optical assembly 100 are shown in FIGS. 2A to 6B and in FIG. 7B and are explained in detail below.

In order to transform the different fundamental modes of the multiple waveguides 2, . . . , n into higher order modes, the light beams of the different multiple waveguides 2, . . . , n have to be imaged onto the optical coupler 200. According to the embodiments of the arrangements illustrated in FIGS. 2A to 4B, the optical assembly 100 comprises an optical device 120 to deflect each of the light beams impacting the optical device 120 from a different one of the multiple waveguides 1, . . . , n to the optical coupler 200. The light beams strike the optical coupler 200 spatially separated from each other. In particular, the optical device 120 is configured to direct each of the light beams impacting the optical device 120 from a different one of the multiple waveguides 1, . . . , n spatially separated from each other to a respective different area of the optical coupler 200 to generate independent higher order modes of the light beams leaving the optical waveguides 2, . . . , n and to keep the fundamental mode of the light beam of the optical waveguide 1 unchanged by means of the optical coupler 200. The optical device 120 may be arranged between the multiple waveguides 1, . . . , n and the optical coupler 200. The optical device 120 may comprise at least one optical lens, such as the optical lenses 121 and 122.

According to a possible embodiment of the arrangement shown in FIGS. 2A, 2B and 4A to 5B, the optical coupler 200 may be configured as a phase mask 210 to convert the separate single modes of the light beams of the different multiple waveguides 2, . . . , n to different higher order modes and to keep the fundamental mode of the light beam of the optical waveguide 1 unchanged. According to another possible embodiment, the optical coupler 200 may be configured as a liquid crystal spatial light modulator 220. The liquid crystal spatial light modulator 220 is configured to dynamically convert the fundamental mode of each of the light beams coupled out of the respective different ones of the multiple waveguides 2, . . . , n to the respective higher order mode of each of the light beams and to keep the fundamental mode of the light beam of the optical waveguide 1 unchanged.

Figure 3:
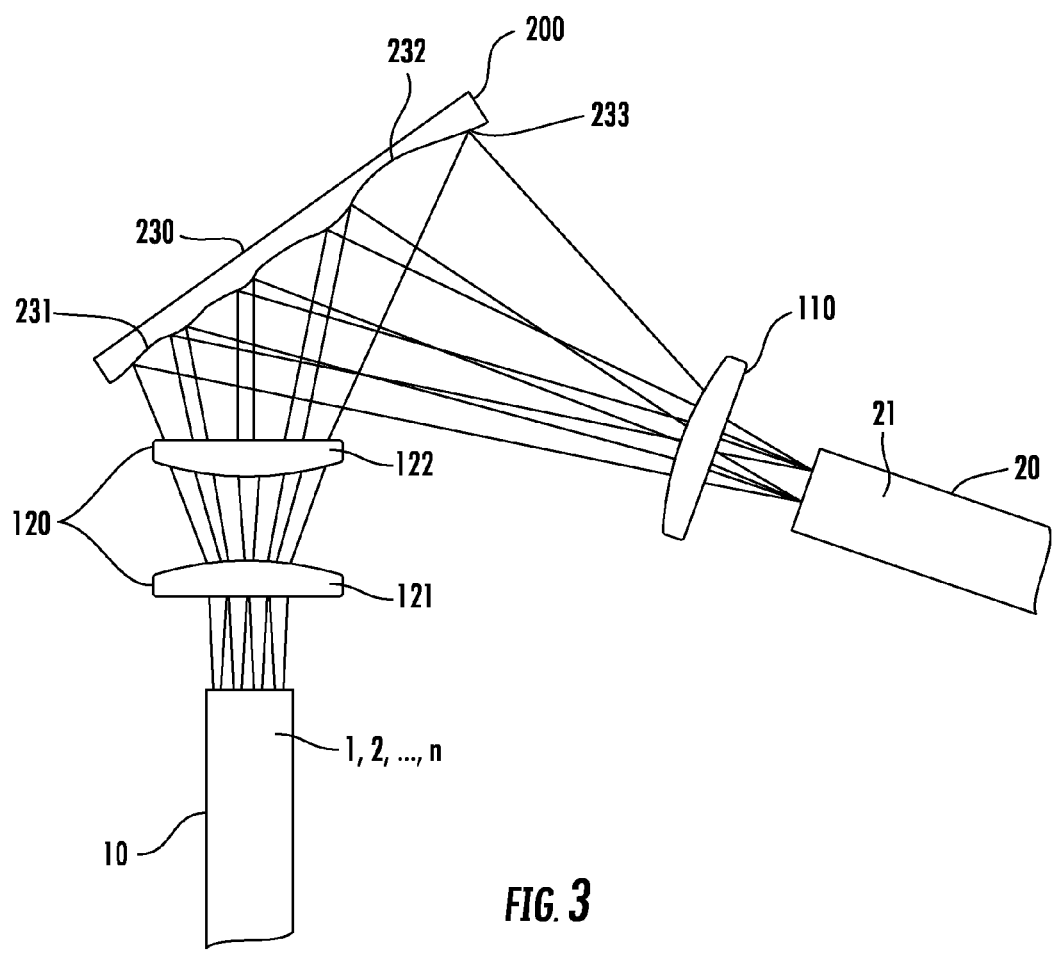
FIG. 3 shows a second embodiment of an arrangement to optically couple multiple waveguides of a multi-core fiber to a few-mode fiber to transfer light from the multiple waveguides to the few-mode fiber.

FIG. 3 shows an embodiment of the arrangement to optically couple multiple waveguides 1, . . . , n of a multi-core fiber 10 to a few-mode fiber 20 to transfer light from the multiple waveguides 1, . . . , n to the few-mode fiber 20, wherein the optical coupler 200 is configured as a mirror device 230 being configured to convert the separate single fundamental modes of the multiple waveguides 2, . . . , n to different higher order modes. The mirror device 230 may be shaped in such a way that the required phase information is imprinted onto the different light beams, before the light beams are focused onto the optical device 110 for imaging to the few-mode fiber 20. The mirror device 230 can be configured to focus/shape the different light beams for launch in the few-mode fiber 20. The light beams impact on spatially separated regions of the mirror device 230 by the optical device 120 in order to transform the different fundamental modes independently to higher order modes and to keep one of the fundamental modes unchanged.

The mirror device 230 may have a coating 231 to convert the respective fundamental mode of each of the light beams coupled out of a respective different one of the multiple waveguides 2, . . . , n to the respective higher order mode of each of the light beams and to keep the fundamental mode of the light beam of the optical waveguide 1 unchanged.

According to another embodiment of the arrangement, the mirror device 230 has phase modifying structures on a reflective surface of the mirror device 230. The mirror device 230 may comprise a structured surface 232 to manipulate the phase of the respective light beam impacting the structured surface of the mirror device from a different one of the multiple waveguides 2, . . . , n. In particular, for each of the n−1 fundamental mode light beams to be transformed, the mirror device 230 may have a microstructured surface 232 to manipulate the phase and a macroscopic shape 233 superposed to focus/shape the light beam for re-launch in the few-mode fiber 20.

Since the use of phase masks or liquid crystal spatial light modulators is not suitable for high optical powers, the mirror device setup is advantageous when high powers or low losses are required for the system. Using a mirror device 230 as optical coupler provides nearly no absorption. In the same way, as a liquid crystal spatial light modulator can be used instead of the phase mask, an adaptive mirror can be used for the mirror device setup rather than a static mirror to change the modes of the light beams. Also, a combination of both embodiments can be used.

Figure 4A:
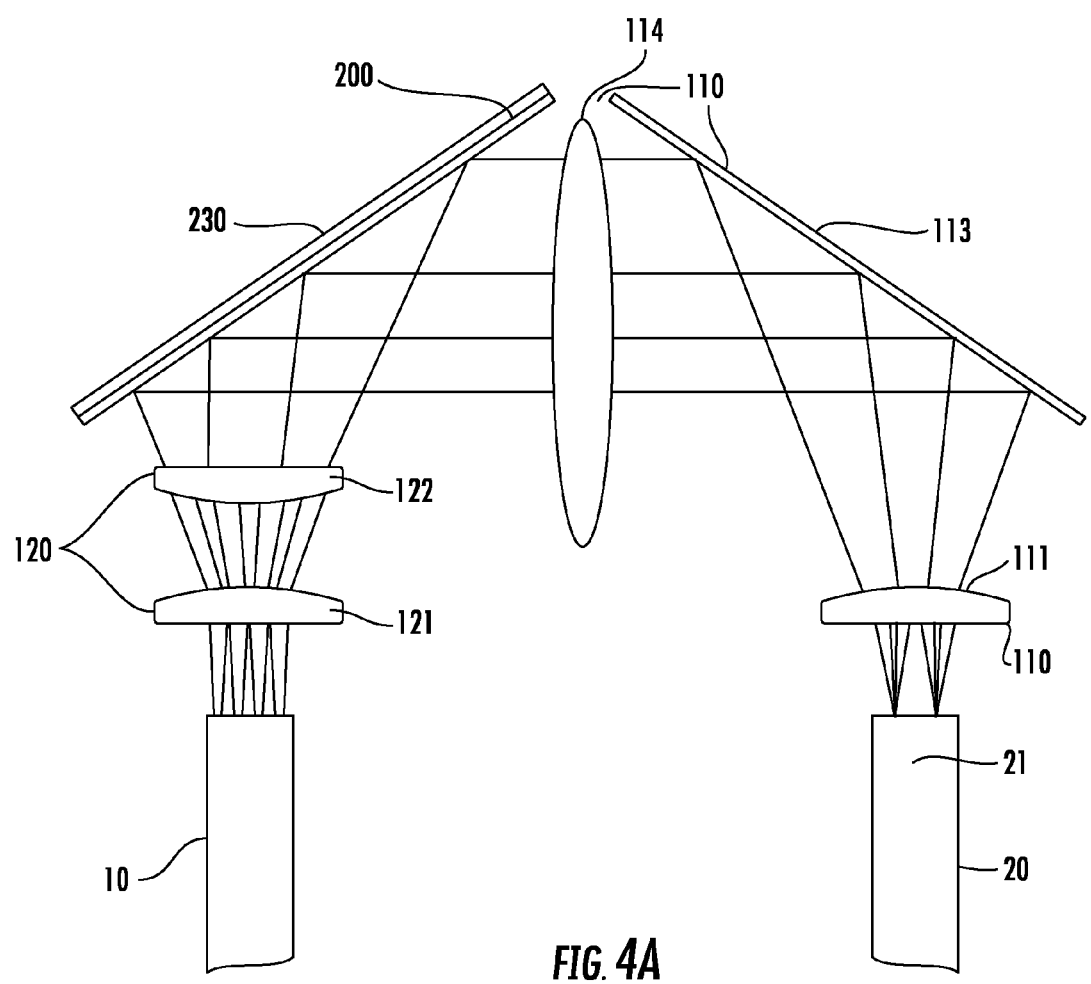
FIG. 4A shows a third embodiment of an arrangement to optically couple multiple waveguides of a multi-core fiber to a few-mode fiber to transfer light from the multiple waveguides to the few-mode fiber.

The transformation of the mode and the shaping of the beam can be separated as shown in FIG. 4A. FIG. 4A shows the mirror device setup, wherein the optical device 110 additionally comprises a mirror device 113 and an optical lens 114 to direct the light beams from the mirror device 230 with the phase modifying functionality to the few-mode fiber 20. The mirror device 230 imprints the phase information onto the beam to change the mode while additional optical elements, exemplary shown by the lens 114, the mirror device 113 and the lens 111 superpose the different beams and launch them into the few-mode fiber 20.

Figure 4B:
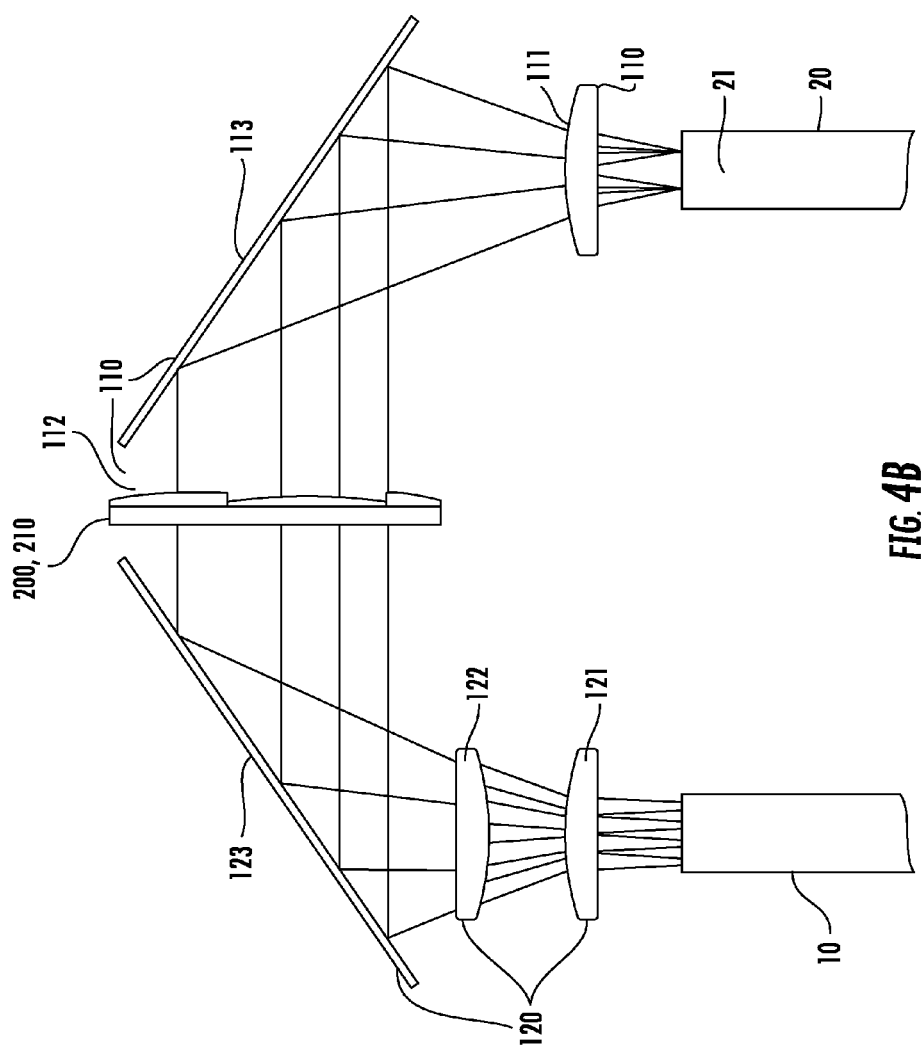
FIG. 4B shows a fourth embodiment of an arrangement to optically couple multiple waveguides of a multi-core fiber to a few-mode fiber to transfer light from the multiple waveguides to the few-mode fiber.

FIG. 4B shows the phase mask setup, wherein the optical device 110 comprises the mirror device 113 to direct the light beams from the phase mask 210 to the optical element 111 and the optical device 120 comprises a mirror device 123 to direct the light beams of the fundamental modes to the phase mask 210. The additional mirror/mirrors and the additional lens shown in FIGS. 4A and 4B may be used to optimize the light beams, minimize aberrations and simplify the imaging on the few-mode fiber 20.

The optical assembly 100 may be minimized by realizing the optical coupler 200 as a micro coupler directly on the fiber facet of the multi-core fiber 10. FIGS. 5A and 5B illustrate an embodiment of the arrangement to optically couple multiple waveguides of a multi-core fiber to a few-mode fiber to transfer light from the multiple waveguides to the few mode fiber from different directions, wherein the optical coupler 200, for example the phase mask 210, is directly attached to the multi-core fiber 10. The optical structure 112 may be arranged on the surface of the optical coupler 200. Suitable methods for fabricating these structures on the end-face include lithography and etching, micro-imprint, or laser milling.

After having transformed the fundamental modes of the light beams leaving the different multiple waveguides 2, . . . , n of the multi-core fiber 10 to the higher order modes, the light beams of the higher order modes from the waveguides 2, . . . , n and the unchanged fundamental mode from the waveguide 1 are directed by the coupling structure 112 to the optical element 111 of the optical device 110 and are focussed on the core section 21 of the few-mode fiber 20. The embodiment of the arrangement to optically couple the multiple waveguides 1, . . . , n to the few-mode fiber 20 as shown in FIGS. 5A and 5B eliminates the need for the optical device 120.

The arrangement to optically couple multiple waveguides to a few-mode fiber is not limited to multiple waveguides of a multi-core fiber. The multiple waveguides 1, . . . , n may be configured as waveguides of a multi-core fiber and may also be configured as waveguides of a grating coupler or as respective waveguides of a plurality of single mode fibers or as single mode surface mounted devices.

Figure 2B:
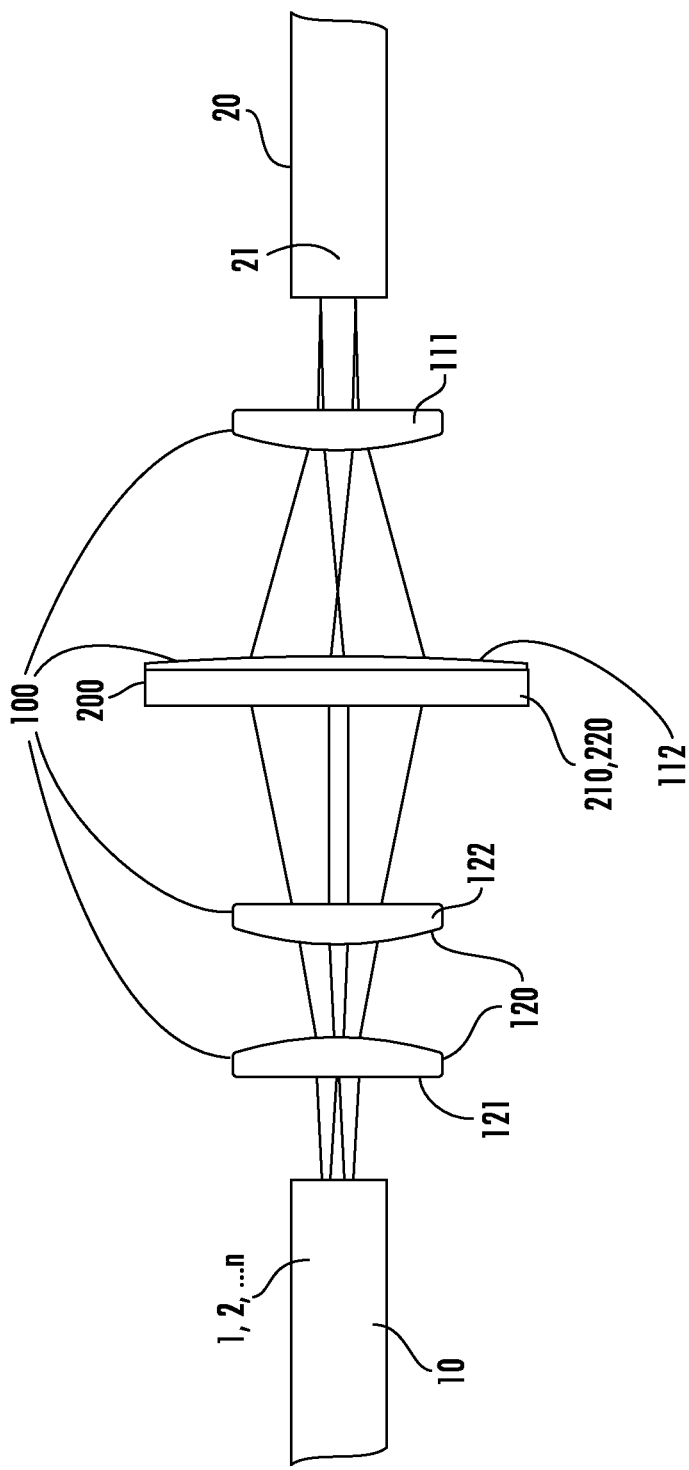
FIG. 2B shows the first embodiment of an arrangement to optically couple multiple waveguides of a multi-core fiber to a few-mode fiber to transfer light from the multiple waveguides to the few-mode fiber from a second direction.
Figure 7A:
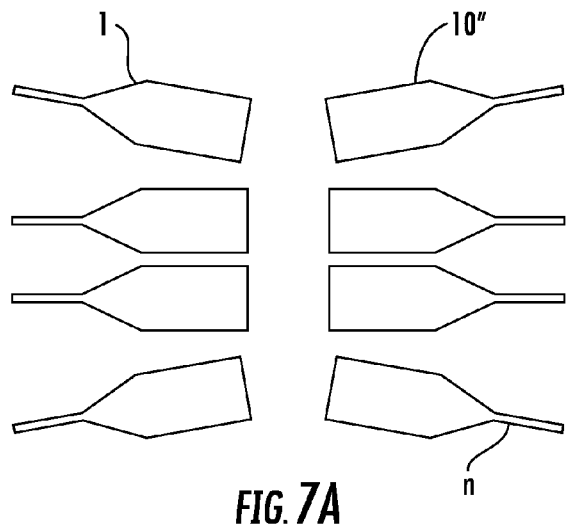
FIG. 7A shows a geometrical arrangement of grating couplers on a chip surface.
Figure 7B:
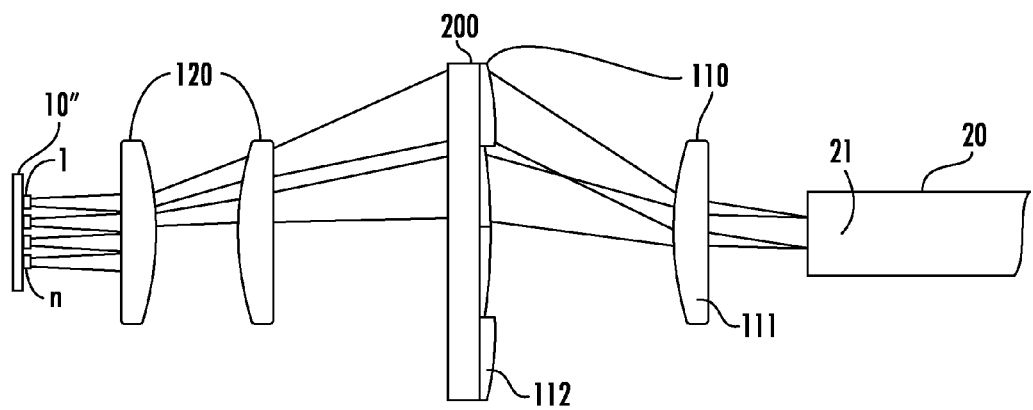
FIG. 7B shows an arrangement to optically couple multiple waveguides of grating couplers to a few-mode fiber.

FIGS. 6A and 6B show an embodiment of the arrangement to optically couple multiple waveguides 1, . . . , n to a few-mode fiber 20 to transfer light from the multiple waveguides to the few mode fiber from different directions, which is similar to the embodiment shown in FIGS. 2A and 2B. In contrast to the embodiment shown in FIGS. 2A and 2B the multiple waveguides 1, . . . , n are configured as waveguides of a plurality of single-mode fibers 10'. FIGS. 7A and 7B show another embodiment of an arrangement to optically couple multiple waveguides 1, . . . , n to a few-mode fiber to transfer light from the multiple waveguides to the few mode fiber. The arrangement of FIGS. 7A and 7B is similar to the arrangement shown in FIGS. 2A and 2B. According to the arrangement illustrated in FIGS. 7A and 7B each of the multiple waveguides 1, . . . , n is configured as a grating coupler. FIG. 7A shows the geometrical arrangement of grating couplers 1, . . . , n on a surface of a chip 10". FIG. 7B shows the coupling out of light of the multiple waveguides 1, . . . , n of the grating couplers of the chip 10" towards the optical assembly 100 and the optical coupler 200 to couple the grating couplers 10" to the few-mode fiber 20.

Principally, the coupling of light transferred from the multiple waveguides 1, . . . , n towards the few-mode fiber 20 can be inversed such that light of different higher order modes is coupled out of the few-mode fiber 20 and coupled in the multiple waveguides 1, . . . , n. FIGS. 8A, 8B, 9A and 9B show different embodiments of respective arrangements to optically couple multiple waveguides 1, . . . , n to a few-mode fiber 20, wherein light is transferred from the few-mode fiber 20 to the multiple waveguides 1, . . . , n. FIGS. 8A to 9B show the multiple waveguides being configured as waveguides of a multi-core fiber 10. The multiple waveguides 1, . . . , n may be also configured as waveguides of a grating coupler structure or as single mode fibers or as single mode surface mounted devices.

The respective arrangements to optically couple the few-mode fiber 20 to the multiple waveguides as shown in FIGS. 8A to 9B comprise an optical assembly 100 to deflect light beams impacting the optical assembly 100 and an optical coupler 200. The optical coupler 200 is configured to convert a higher order mode of each of the light beams coupled out of the few-mode fiber 20 to a respective fundamental mode of each of the light beams. The optical assembly 100 comprises an optical device 110 to deflect each of the light beams impacting the optical device 110 from the optical coupler 200 to a respective different one of the multiple waveguides 1, . . . , n.

The optical coupler 200 may be configured as a phase mask that differentiates the different/higher order modes of the light beams and convert them to the respective fundamental mode. As shown in FIGS. 8A to 9B, a light beam leaving the few-mode fiber 20 is imaged onto the optical coupler 200 that converts the different modes of the respective light beams to their respective fundamental mode. According to an embodiment, the phase mask 200 is configured to change the direction of propagation for the different modes of the light beams differently so that the different modes are not only converted to a fundamental mode but can also be differentiated spatially. While the phase patterns of the optical couplers for the conversion of the fundamental mode are separated in the embodiments shown in FIGS. 2A to 7B, the respective phase patterns of the optical coupler 200 shown in the embodiments of the arrangements of FIGS. 8A to 9B are superposed.

The respective fundamental mode of the light beams is imaged by the optical device 110 onto the different optical waveguides 1, . . . , n, for example onto the different cores of the multi-core fiber 10. The optical device 110 may be incorporated in the phase mask to give the different fundamental modes slightly different propagation directions so that the fundamental modes are imaged onto the different waveguides 1, . . . , n. According to another embodiment, the optical device 110 may be partly combined with the phase mask, for example be configured as separate lenses attached to the phase mask or being completely separated from the phase mask.

This may lead to a decrease in conversion efficiency and cross-talk between the different channels. However, when coupling the different channels into the multi-core fiber, the single mode cores act as spatial filters/pinholes for the fundamental mode intended for the respective cores. Even if parts of the light beams of the higher order modes are coupled into the single-mode waveguides, the propagation of these parts in the single-mode waveguides is lossy and after a sufficiently long propagation in the single mode cores of the waveguides, these parts will fade.

FIG. 8A and FIG. 8B show an embodiment of the arrangement to optically couple multiple waveguides 1, ..., n of a multi-core fiber 10 to a few-mode fiber 20 to transfer light from the few-mode fiber to the multiple waveguides from different viewing directions. The optical assembly 100 only comprises the optical device 110. The optical device 110 comprises an optical element 111 and an optical structure 112. The optical structure 112 is configured to deflect each of the light beams impacting the optical structure 112 from the optical coupler 200 to the optical element 111. The optical structure 112 may be arranged on a surface of the optical coupler 200. According to another possible embodiment, the optical structure 112 may be incorporated in the optical coupler 200.

The optical element 111 may be configured to deflect each of the light beams impacting the optical element 111 from the optical structure 112 to the respective different one of the multiple waveguides 1, ..., n. The optical element 111 may be arranged between the optical structure 112 and the multiple waveguides 1, ..., n of the multi-core fiber 10.

In the embodiment of the arrangement to optically couple the multiple waveguides 1, ..., n to the few-mode fiber 20 shown in FIGS. 8A and 8B, the optical coupler 200 is configured as a micro-coupler being directly attached to, or fabricated on, the end face of the few-mode fiber 20. FIGS. 9A and 9B show an embodiment of an arrangement to optically couple the multiple waveguides 1, ..., n to the few-mode fiber 20 to transfer light from the few-mode fiber to the multiple waveguides, wherein the optical coupler 200 is arranged between the few-mode fiber 20 and the multi-core fiber 10. In order to direct the light beams of the different modes leaving the few-mode fiber 20, the optical assembly 100 comprises an optical device 120 to deflect each of the light beams impacting the optical device 120 from the few-mode fiber 20 to the optical coupler 200. The optical device 120 which may comprise optical lenses 121 and 122 being arranged between the few-mode fiber 20 and the optical coupler 200.

FIG. 10 shows electric field amplitude profiles/intensity profiles of different modes that may be generated by the optical coupler 200 from the fundamental mode. The fundamental mode having the parameters l=0 and m=1 is shown on the top left side of FIG. 10. In order to make the coupling independent of the orientation of the few-mode fiber and improve the coupling from the few-mode fiber to the multi-core fiber, several single mode fibers, or other receiving structures, the modes provided by the optical coupler 200 may be limited to circular symmetric modes, i.e. the modes having a parameter l=0, as shown in FIG. 10. For this purpose, the optical coupler 200 may be configured to convert the respective fundamental mode of each of the light beams coupled out of the respective different ones of the multiple waveguides 2, ..., n to a respective circular symmetric mode of each of the light beams.

Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An arrangement to optically couple multiple waveguides of a multi-core fiber to a few-mode fiber to transfer light from the multiple waveguides of the multi-core fiber to the few-mode fiber, comprising:

an optical assembly to respectively deflect light beams impacting the optical assembly, an optical coupler being configured to convert a respective fundamental mode of a plurality of the light beams coupled out of a respective different one of a plurality of the multiple waveguides of the multi-core fiber and impacting the optical coupler to a respective higher order mode of each of the plurality of the light beams, wherein the optical assembly comprises a first optical device to deflect each of the plurality of the light beams impacting the first optical device from the optical coupler to a core section of the few-mode fiber to transfer light within the few-mode fiber, the first optical device being arranged between the optical coupler and the few-mode fiber, wherein the optical coupler is configured to keep a fundamental mode of a light beam of one of the multiple waveguides of the multi-core fiber impacting the optical coupler and being different from the plurality of the multiple waveguides of the multi-core fiber unchanged, and wherein the first optical device of the optical assembly is configured to deflect the light beam of said one of the multiple waveguides impacting the first optical device from the optical coupler to the core section of the few-mode fiber.

2. The arrangement of claim 1, wherein the first optical device comprises an optical element and an optical structure, wherein the optical structure is configured to deflect each of the light beams impacting the optical structure from the optical coupler to the optical element, the optical structure being arranged on a surface of the optical coupler, wherein the optical element is configured to deflect each of the light beams impacting the optical element from the optical structure to the core section of the few-mode fiber, the optical element being arranged between the optical structure and the few-mode fiber.

3. The arrangement of claim 1, wherein the optical assembly comprises a second optical device to deflect each of the light beams impacting the second optical device from the different ones of the multiple waveguides to the optical coupler.

4. The arrangement of claim 3, wherein the second optical device is configured to direct each of the light beams impacting the second optical device from the different ones of the multiple waveguides to a respective different area of the optical coupler.

5. The arrangement of claim 3, wherein the second optical device is arranged between the multiple waveguides and the optical coupler.

6. The arrangement of claim 3, wherein the second optical device includes a first optical lens and a second optical lens, the first optical lens is configured to receive the plurality of light beams from the multiple waveguides of the multi-core fiber and direct the plurality of light beams to the second optical lens, and the second optical lens is configured to receive the plurality of light beams from the first optical lens and direct the plurality of light beams to the optical coupler.

7. The arrangement of claim 6, wherein the first optical lens is configured to direct each of the plurality of light beams to a respective different area of the second optical lens.

8. The arrangement of claim 7, wherein the second optical lens is configured to direct each of the plurality of light beams to a respective different area of the optical coupler.

9. The arrangement of claim 1, wherein the optical coupler is configured as a phase mask.

10. The arrangement of claim 1, wherein the optical coupler is configured as a liquid crystal spatial light modulator to dynamically convert the respective fundamental mode of the plurality of the light beams coupled out of the respective different ones of the plurality of the multiple waveguides to the respective higher order mode of each of the plurality of the light beams.

11. The arrangement of claim 1, wherein the optical coupler is configured as a mirror device having a coating to convert the respective fundamental mode of the plurality of the light beams coupled out of the respective different ones of the plurality of the multiple waveguides to the respective higher order mode of each of the plurality of the light beams.

12. The arrangement of claim 1, wherein the optical coupler is configured as a mirror device comprising a structured surface to manipulate the respective phase of the plurality of the light beams impacting the structured surface of the mirror device from the different ones of the plurality of the multiple waveguides.

13. The arrangement of claim 1, wherein the optical coupler is configured to convert the respective fundamental mode of the plurality of the light beams coupled out of the respective different ones of the plurality of the multiple waveguides to a respective circularly symmetric mode of each of the plurality of the light beams.

14. An arrangement to optically couple multiple waveguides of a multi-core fiber to a few-mode fiber to transfer light from the multiple waveguides of the multi-core fiber to the few-mode fiber, comprising:

an optical assembly to respectively deflect light beams impacting the optical assembly, an optical coupler being configured to convert a respective fundamental mode of a plurality of the light beams coupled out of a respective different one of a plurality of the multiple waveguides of the multi-core fiber and impacting the optical coupler to a respective higher order mode of each of the plurality of the light beams, wherein the optical assembly comprises a first optical device to deflect each of the plurality of the light beams impacting the first optical device from the optical coupler to a core section of the few-mode fiber to transfer light within the few-mode fiber, the first optical device being arranged between the optical coupler and the few-mode fiber; and the optical coupler converts the respective fundamental mode of the plurality of the light beams coupled out of the respective different ones of the plurality of the multiple waveguides of the multi-core fiber to a respective circularly symmetric mode of each of the plurality of the light beams wherein the first optical device comprises an optical element and an optical structure, wherein the optical structure is configured to deflect each of the light beams impacting the optical structure from the optical coupler to the optical element, the optical structure being arranged on a surface of the optical coupler or being incorporated in the optical coupler, and wherein the optical element is configured to deflect each of the light beams impacting the optical element from the optical structure to the core section of the few-mode fiber, the optical element being arranged between the optical structure and the few-mode fiber.

15. The arrangement of claim 14, wherein the optical assembly comprises a second optical device to deflect each of the light beams impacting the second optical device from the different ones of the multiple waveguides to the optical coupler.

16. The arrangement of claim 15, wherein the second optical device is configured to direct each of the light beams impacting the second optical device from the different ones of the multiple waveguides to a respective different area of the optical coupler.

17. The arrangement of claim 15, wherein the second optical device is arranged between the multiple waveguides and the optical coupler.

18. The arrangement of claim 14, wherein the optical coupler is configured as a phase mask.

* * * * *